C. L. KENNICOTT.
ART OF RIVETING.
APPLICATION FILED APR. 10, 1911.
1,004,275.
Patented Sept. 26, 1911.
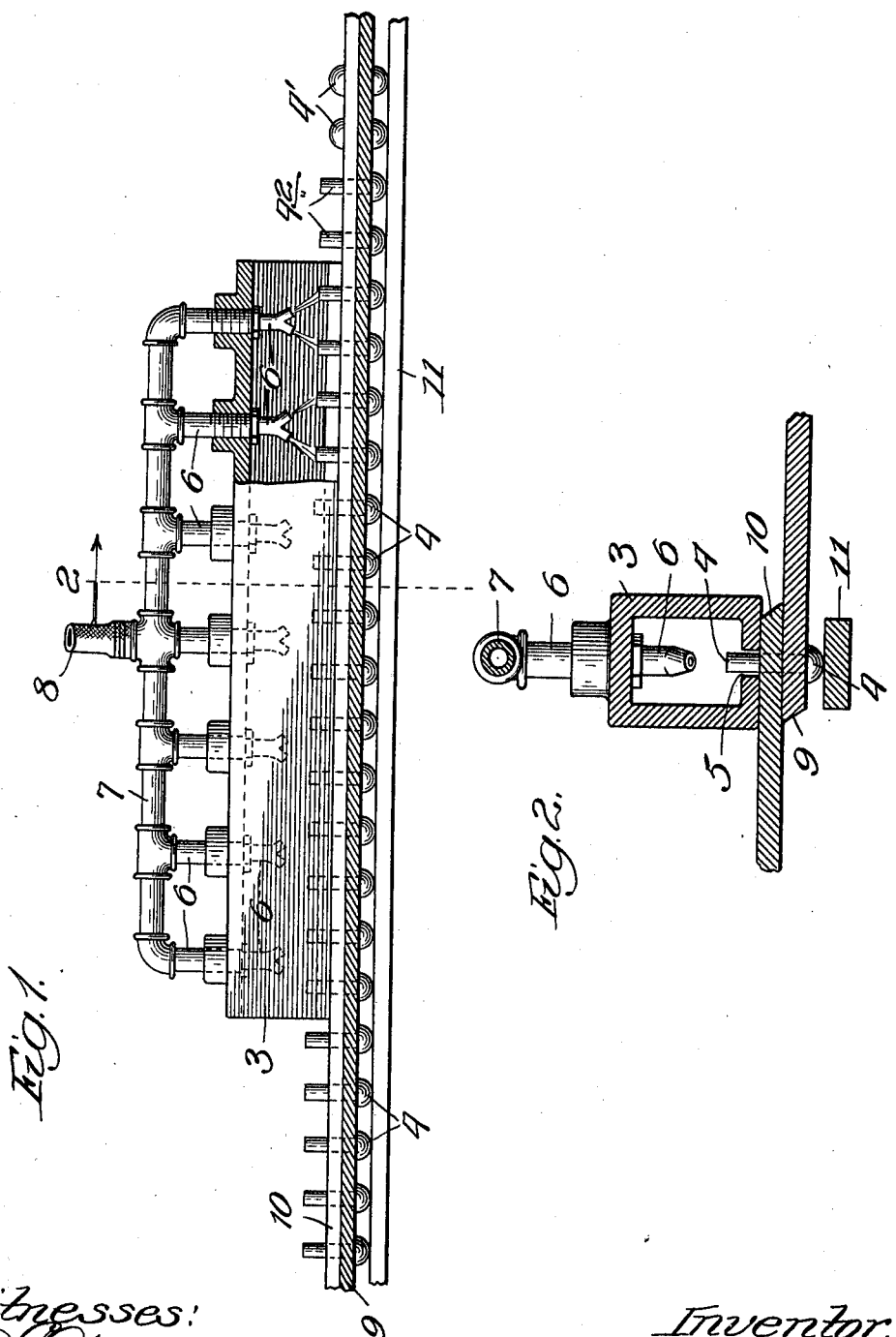
Witnesses:
C. E. Gaylord.
G. F. Chase.
Inventor:
Cass L. Kennicott,
By Dyrenforth, Lee, Chritton & Wiles,
Att'ys.

UNITED STATES PATENT OFFICE.

CASS L. KENNICOTT, OF CHICAGO HEIGHTS, ILLINOIS, ASSIGNOR TO THE KENNICOTT COMPANY, OF CHICAGO, ILLINOIS, A CORPORATION OF ILLINOIS.

ART OF RIVETING.

1,004,275.  Specification of Letters Patent.  Patented Sept. 26, 1911.

Application filed April 10, 1911.  Serial No. 620,187.

*To all whom it may concern:*

Be it known that I, CASS L. KENNICOTT, a citizen of the United States, residing at Chicago Heights, in the county of Cook and State of Illinois, have invented a new and useful Improvement in the Art of Riveting, of which the following is a specification.

My invention relates to an improvement in the art of riveting bolts, and more especially the larger-sized bolts used in boiler, tank, structural-metal and other heavy work.

The primary object of my invention is to enable the riveting of bolts to be performed without heating them to a welding heat, to be handled in that condition, as is the more usual practice, preparatory to inserting them into the holes provided to receive them in the work; and to avoid, moreover, heating the entire bolt, which is undesirable because the shrinkage which it necessarily undergoes, in cooling, tends to contract it and thus impair the desirable tight fit of the section thereof which is surrounded by the rivet-hole.

My improvement consists in inserting a plurality of the bolts through the holes provided for them in the work, and shielding their protruding ends against the cooling influence of the atmosphere while applying heat to those ends and thereby bringing the bolts to a red-hot condition for welding, and unshielding the heated ends of one or more of the bolts at a time, thereby to expose them for the riveting operation, during which the ends of the rest of the inserted bolts are kept shielded to prevent dissipation of their heat, and are meantime preferably also continued under subjection to the heating medium.

For the practice of my invention, I have devised the apparatus illustrated in the accompanying drawing, as being the best form thereof for the purpose known to me, although other more or less desirable forms of the same may be provided.

In the drawing, Figure 1 is a broken view in side elevation, partly sectional, showing an apparatus operatively applied in the practice of my invention, and Fig. 2 is a section on line 2, Fig. 1.

A shield or cover 3, of metal or other suitable material, shown of rectangular cross-section and sufficiently long to cover a plurality of bolts 4 in a series thereof, is provided in its base with a longitudinal slot 5 extending throughout the length of the shield. The top of the shield is formed with a series of flanged internally-threaded holes through which project into the interior of the shield burner-tubes 6 for gaseous fuel, which extend from a manifold 7 to which a supply-pipe 8 leads from a suitable source (not shown).

To practice my improvement upon straight work, such as that illustrated, the lapping sections 9 and 10 thereof have the cold bolts inserted through the registering bolt-holes provided in them, and a "dolly-bar" 11 is employed to retain the bolts, at their heads, in place until they are riveted. The flame at the burners 6 heats the ends of the bolts covered by and projecting into the cover 3, which is shifted from time to time to uncover one or more of the heated bolt-ends and expose them to access for riveting, as shown of the bolts at $4^2$ in Fig. 1, wherein two of the bolts in the series are represented at $4^1$ as having been uncovered and riveted. During the progress of the riveting work the shifting of the shield causes it to cover any additional bolts that may be contained or included in the series thereof to heat their ends and thus prepare them for riveting, while the ends of the bolts within the shield in advance of those thus added are maintained under subjection to the heat therein during the exposure of the bolts undergoing the riveting action.

The drawing illustrates the shield as being applied above the projecting bolt-ends, but it may, obviously, be applied, when properly supported, laterally thereto or underneath them, depending on the character of the work; and the shape of the shield should, to keep it adequately closed, conform to that of the surface to which it is applied to properly fit the latter.

What I claim as new and desire to secure by Letters Patent, is—

The improvement in the art of riveting, which consists in introducing a plurality of bolts, in unheated condition, into holes provided to receive them in the work, covering projecting ends of the bolts and applying heat within the cover to and thereby heating said ends, and shifting the cover, at intervals, over the bolt-ends to expose them one or more at a time to access for riveting while retaining the others within the cover, for the purpose set forth.

CASS L. KENNICOTT.

In the presence of—
 OTTILIE C. AVISUS,
 RALPH SCHAEFER.

Copies of this patent may be obtained for five cents each, by addressing the "Commissioner of Patents, Washington, D. C."